US011855360B1

(12) United States Patent
Ziegler et al.

(10) Patent No.: US 11,855,360 B1
(45) Date of Patent: Dec. 26, 2023

(54) AIRBORNE MESH NETWORK FORMING PHASE ARRAY ANTENNA

(71) Applicant: 4S-SILVERSWORD SOFTWARE AND SERVICES, LLC, Catonsville, MD (US)

(72) Inventors: William Robert Allen Ziegler, Ijamsville, MD (US); Ronald H. Smith, Rockville, MD (US)

(73) Assignee: 4S-Silversword Software and Services, LLC, Catonsville, MD (US)

( * ) Notice: Subject to any disclaimer, the term of this patent is extended or adjusted under 35 U.S.C. 154(b) by 12 days.

(21) Appl. No.: 16/779,943

(22) Filed: Feb. 3, 2020

Related U.S. Application Data

(63) Continuation-in-part of application No. 15/991,973, filed on May 29, 2018, now Pat. No. 10,608,741.

(51) Int. Cl.
*H04B 10/118* (2013.01)
*H01Q 3/01* (2006.01)
*H04B 7/185* (2006.01)

(52) U.S. Cl.
CPC ........... *H01Q 3/01* (2013.01); *H04B 7/18506* (2013.01); *H04B 10/118* (2013.01)

(58) Field of Classification Search
CPC ................. H04B 7/18506; H04B 10/118
See application file for complete search history.

(56) References Cited

U.S. PATENT DOCUMENTS

| 2014/0376914 | A1* | 12/2014 | Miniscalco | H04B 7/18504 398/58 |
| 2015/0293225 | A1* | 10/2015 | Riley | G05D 1/104 356/4.01 |
| 2016/0046387 | A1* | 2/2016 | Frolov | B64B 1/00 244/59 |
| 2018/0069610 | A1* | 3/2018 | Alexander | H04B 7/0617 |
| 2018/0074172 | A1* | 3/2018 | Gianvittorio | H01Q 3/34 |
| 2020/0007384 | A1* | 1/2020 | Mueck | H04L 43/50 |

* cited by examiner

*Primary Examiner* — Nathan M Cors
(74) *Attorney, Agent, or Firm* — GIBRALTAR CONSULTING LLC; Tariq S. Najee-ullah

(57) ABSTRACT

Disclosed herein is a method for communicating between platforms, comprising the steps of initializing a first platform and a second platform; optically tracking a movement of the second platform by the first platform; and optically communicating bi-directionally between the first platform and the second platform. Disclosed herein is an optical communication device comprising various elements including but not limited to: a processor configured to provide at least a tracking mode and a communications mode; an input-output interface coupled to the processor; an electro-optic controller coupled to the input-output interface; an acquisition-tracking portion coupled to the electro-optic controller; and a communication portion coupled to the electro-optic controller. Disclosed herein is a method for communicating between platforms, comprising forming a phase array antenna, wherein the phase array antenna comprises a plurality of platforms arranged in a platform community; and synchronizing a time measurement at each of the platforms, wherein each platform comprises an optical communication device.

11 Claims, 18 Drawing Sheets

TALOC measurements between 2 moving platforms

*TALOC measurements between 2 moving platforms*

FIG. 3A

*Figure 3A. Phase array antenna shifts from signal seed UAV to ground station communication*

Custom UAV shape and close formation flying creates dense antenna array

FIGURE 7 presents a bottom view of UAV underside optics showing 4 apertures covering 360 degrees in azimuth. Not shown are retroreflector arrays. Handoff among Field of Regard (FOR) sectors may be handled electronically.

360 Degree Short/Medium Range TALOC Unit

AIRBORNE MESH NETWORK FORMING PHASE ARRAY ANTENNA

RELATED APPLICATION(S)

Under provisions of 35 U.S.C. § 119(a), the Applicants claim the benefit of U.S. non-provisional application Ser. No. 15/991,973, filed May 29, 2018, in the name of William R. A. Ziegler and Ronald H. Smith and entitled "Through the Air Link Optical Component," assigned to the assignee of the present application, is hereby incorporated by reference.

Related international application no. PCT/US2020/016458 filed under the P.C.T. on even date Feb. 3, 2020 herewith in the name of William R. A. Ziegler and Ronald H. Smith, entitled "AIRBORNE MESH NETWORK FORMING PHASE ARRAY ANTENNA," assigned to the assignee of the present application, is hereby incorporated by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to a modular multi-beam, airborne, free space optical communication system. More specifically the present disclosure further is associated with at least the CPC classifications: H01Q3/42 Arrangements for changing or varying the orientation or the shape of the directional pattern of the waves radiated from an antenna or antenna system varying the relative phase or relative amplitude of energization between two or more active radiating elements; varying the distribution of energy across a radiating aperture varying the relative phase between the radiating elements of an array by electrical means; H01Q3/00—Arrangements for changing or varying the orientation or the shape of the directional pattern of the waves radiated from an antenna or antenna system; H01Q3/26—Arrangements for changing or varying the orientation or the shape of the directional pattern of the waves radiated from an antenna or antenna system varying the relative phase or relative amplitude of energization between two or more active radiating elements; varying the distribution of energy across a radiating aperture; H01Q3/30—Arrangements for changing or varying the orientation or the shape of the directional pattern of the waves radiated from an antenna or antenna system varying the relative phase or relative amplitude of energization between two or more active radiating elements; varying the distribution of energy across a radiating aperture varying the relative phase between the radiating elements of an array; H01Q3/34—Arrangements for changing or varying the orientation or the shape of the directional pattern of the waves radiated from an antenna or antenna system varying the relative phase or relative amplitude of energization between two or more active radiating elements; varying the distribution of energy across a radiating aperture varying the relative phase between the radiating elements of an array by electrical means; H01Q3/2652 Self-phasing arrays; G01S—radio direction-finding; radio navigation; determining distance or velocity by use of radio waves; locating or presence-detecting by use of the reflection or reradiation of radio waves; analogous arrangements using other waves; G01S7/4026 Antenna boresight; G01S7/4817 Constructional features, e.g. arrangements of optical elements relating to scanning; G01S7/52004 Means for monitoring or calibrating; G05D1/0202 Control of position or course in two dimensions specially adapted to aircraft; G05D1/0206 Control of position or course in two dimensions specially adapted to water vehicles; G05D1/0231 Control of position or course in two dimensions specially adapted to land vehicles using optical position detecting means; G05D1/027 Control of position or course in two dimensions specially adapted to land vehicles using internal positioning means comprising inertial navigation means, e.g. azimuth detector; B64C2201/021 Airplanes, i.e. having wings and tail planes.

BACKGROUND

Airborne Robotic Autonomous Systems (RAS) are gaining increased roles and acceptance in the battle space, but advances in real-time expert system convergence are required in order to fully realize the potential of combined optical/RF communication. While there are some specific advances with regarding the use of data fusion to create an accurate 3D map of the relative positions of all platform community elements mounted on separate moving platforms and regarding millisecond real time processing, these advancements have not been fully integrated and developed in a way that is actionable.

Accordingly, there remains a need for improved systems and methods for providing an airborne mobile phase array antenna capable of self-organization and full situation awareness leading to actionable information and guidance. This need and other needs are satisfied by the various aspects of the present disclosure.

SUMMARY OF THE DISCLOSURE

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In accordance with the purposes of the disclosure, as embodied and broadly described herein, the disclosure, in one aspect, relates to devices, systems, and methods for an airborne mesh network forming phase array antenna. In another aspect, the disclosure relates to a method for communicating between platforms, comprising the steps of initializing a first platform and a second platform; optically tracking a movement of the second platform by the first platform; and optically communicating bi-directionally between the first platform and the second platform. In yet another aspect, the disclosure relates to an optical communication device comprising various elements including but not limited to: a processor configured to provide at least a tracking mode and a communications mode; an input-output interface coupled to the processor; an electro-optic controller coupled to the input-output interface; an acquisition-tracking portion coupled to the electro-optic controller; and a communication portion coupled to the electro-optic controller.

In further aspects, the present disclosure may generally relate to a Free Space Optical (FSO) system identified as a Through-the-Air Link Optical Component (TALOC). In further aspects, the present disclosure also relates to an airborne mesh network forming phase array antenna which may be configured to enable a TALOC to provide the following functions including but not limited to: providing multi-GHz data exchange among airborne platform community elements in line of sight with one another, measuring distance between communicating elements with high accuracy, measuring 2-axis pose angle of a first platform relative to a second communicating platform, and supporting full function links to multiple communicating elements by designating each of the platform community elements in turn as a first platform that is connected by multiple beams to other platform community elements and measuring range and angles relative to those other elements.

In one or more aspects, when carried aboard an airborne platform, emitted power may be increased to extend acquisition and communications range. In even further aspects, the present disclosure also relates to the use of a plurality of wavelengths including but not limited to a plurality of wavelengths having high atmospheric transmission bands between 1500 and 1700 nanometers.

In even further aspects, the present disclosure also relates to use of a TALOC to thereby enable a mesh network constituting an expert system with distributed processors capable of fusing all relative distance and angle measurements into a highly accurate 3D map of the overall platform community. In yet even further aspects, the present disclosure also provides for using the computed 3D map to enable the platform community to self-organize into a mobile phase array antenna. In even further aspects, the present disclosure may provide for an apparatus to convey to one or more operations center processors the information needed to designate RF links among arbitrary points within an information sharing space.

In even further aspects, the present disclosure also relates to a system, method and apparatus providing one or more development stages of an airborne mesh network forming phase array antenna. In one or more aspects, the present disclosure relates to a system of devices, machines, processors, computing and electronic devices, and supporting technology providing an airborne mesh network forming phase array antenna. In further aspects, the present disclosure provides a system architecture, software design, and implementation of an airborne mesh network forming phase array antenna. In even further aspects, the present disclosure may generally relate to an expert system formation of an airborne mesh network forming phase array antenna which provides for autonomous determination of all platform community positions, and formation of a mobile phase array antenna. In yet even further aspects, the present disclosure also provides an airborne mesh network forming phase array antenna configured to provide operators with full range RF interconnection within the communication space. In yet another aspect, the present disclosure may provide an airborne mesh network forming phase array antenna rated at fieldable levels of platform community technology readiness.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only.

Furthermore, the drawings may contain text or captions that may explain certain embodiments of the present disclosure. This text is included for illustrative, non-limiting, explanatory purposes of certain embodiments detailed in the present disclosure. In the drawings:

Figure 1:
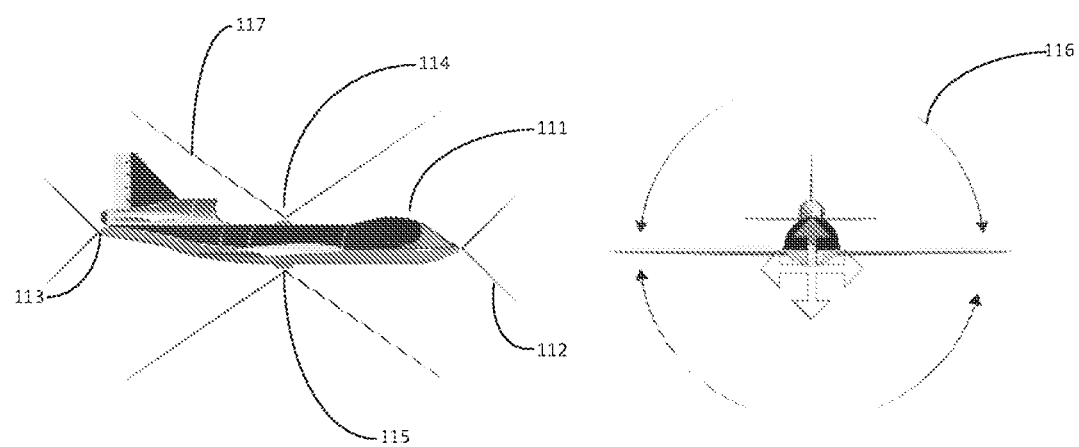

The drawings and figures incorporated within this document are:

FIG. 1 depicts a side and front view of a representative mobile platform comprising a TALOC embodiment consistent with the present disclosure.

Figure 2:
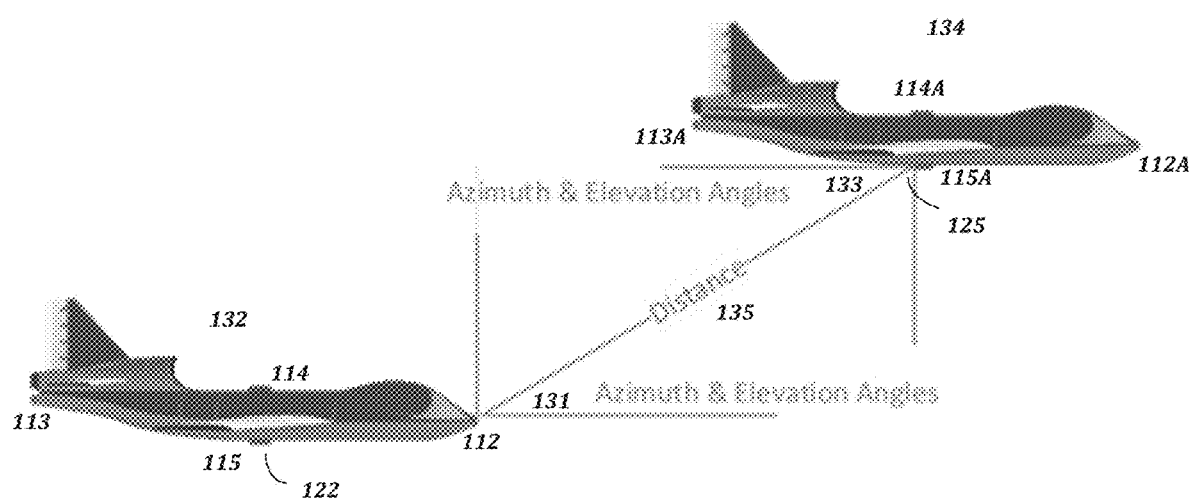

FIG. 2 shows TALOC measurements between two moving platforms wherein the TALOC units are affixed to aircraft vehicles consistent with the present disclosure.

Figure 3B:
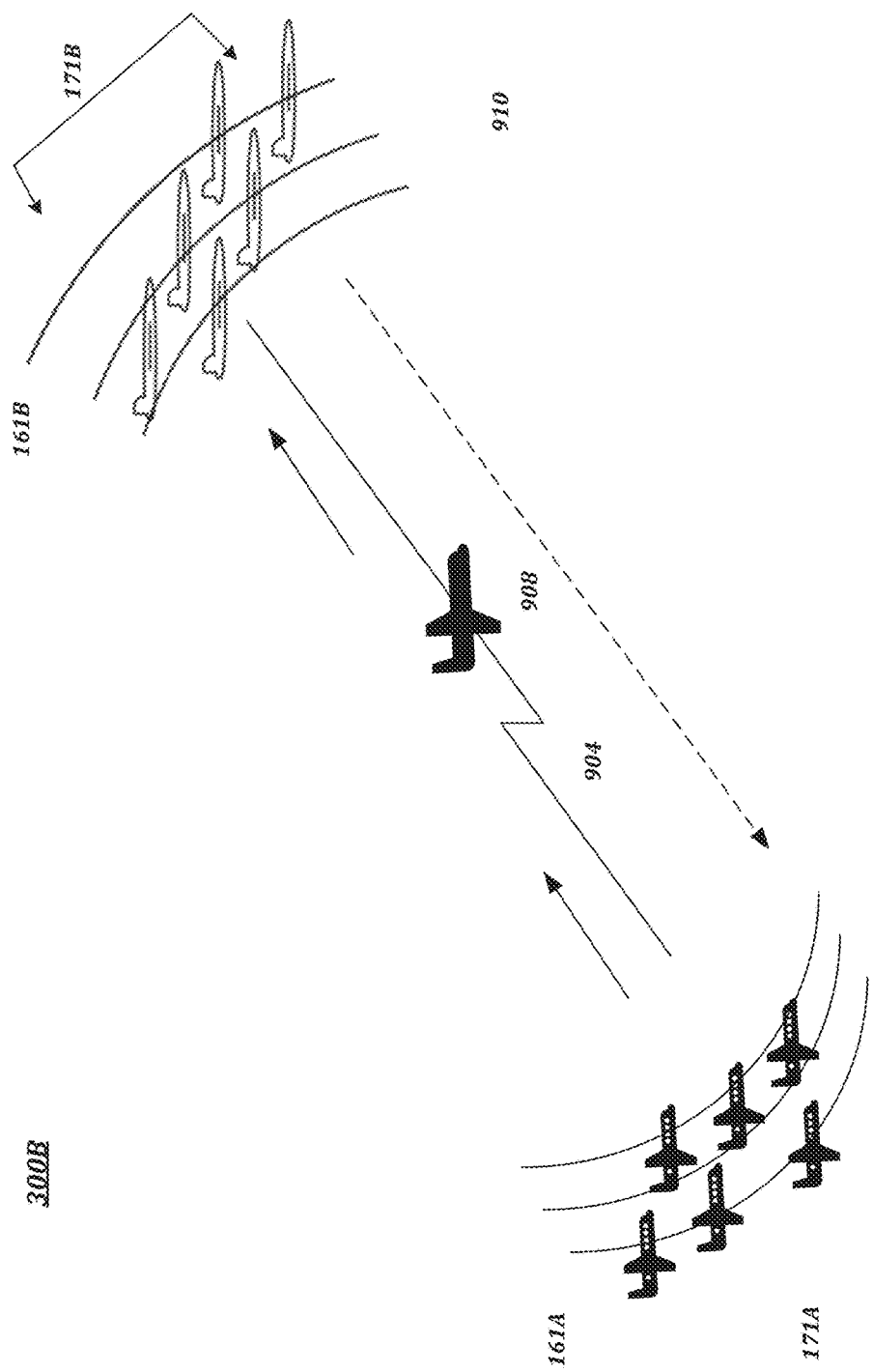
Figure 3C:
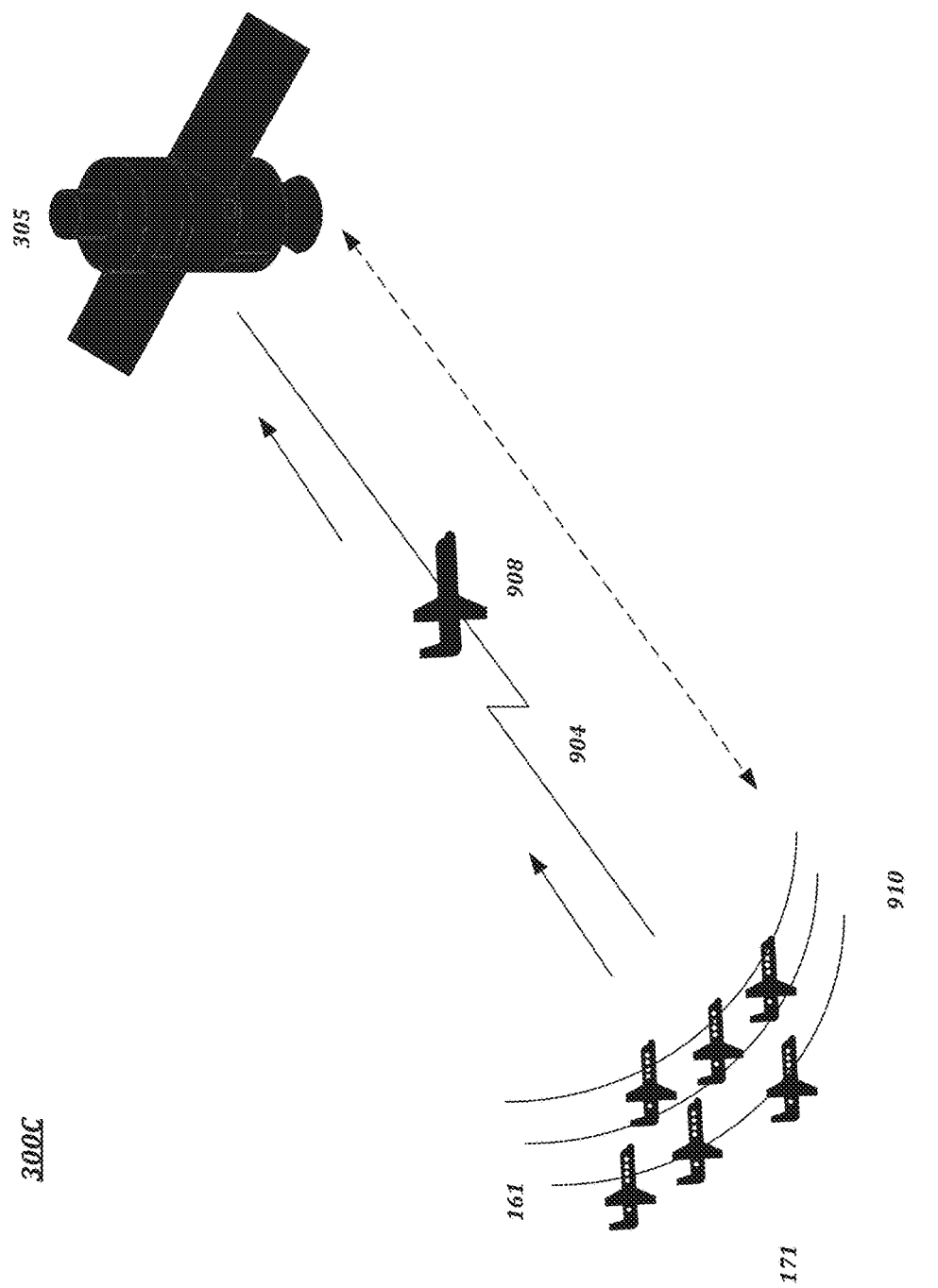

FIG. 3A depicts a physical application of an antenna array using a plurality of platforms consistent with the present disclosure. FIG. 3B-3C depicts alternative embodiments of an antenna array using the plurality of platforms.

Figure 4A:
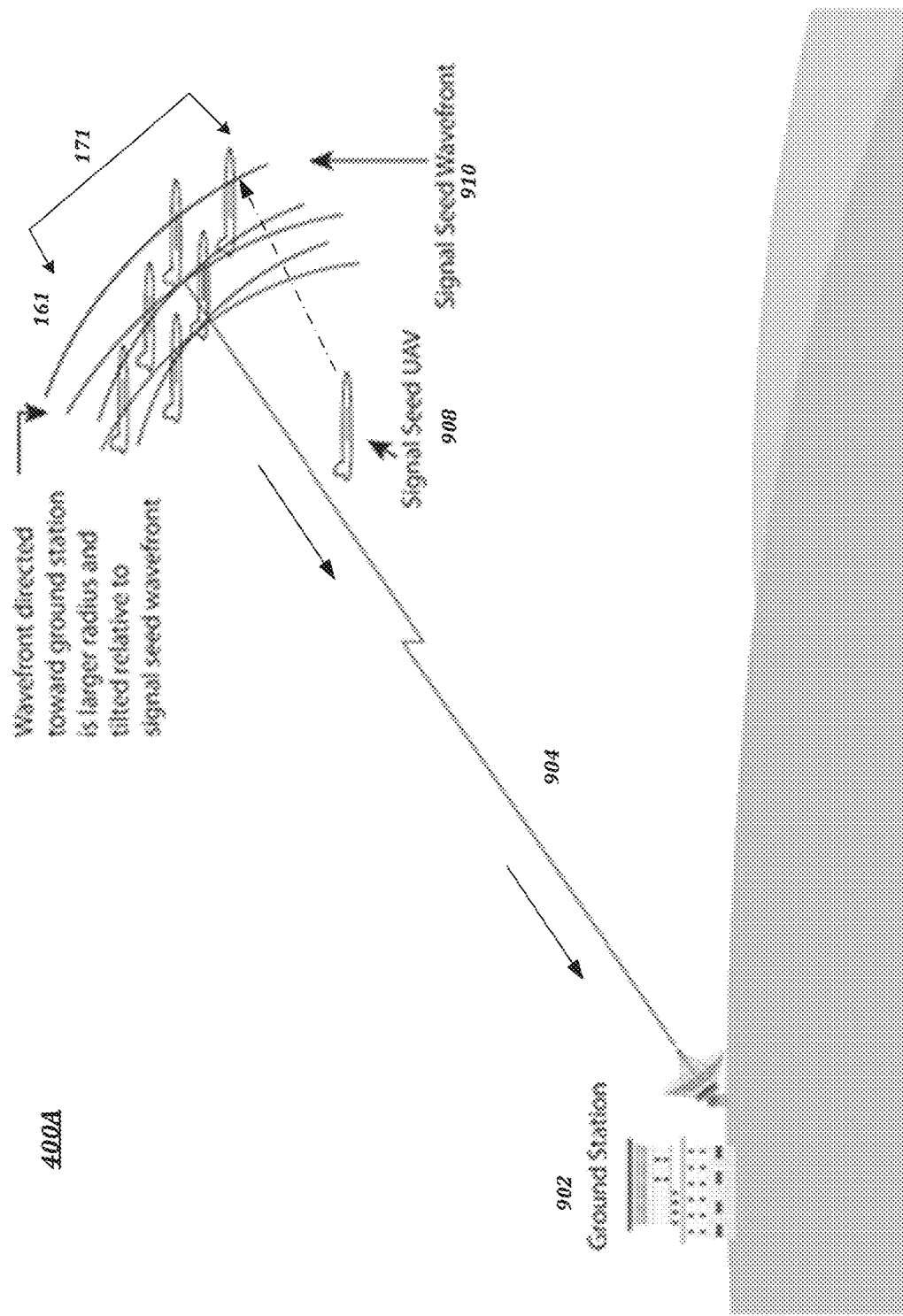
Figure 4B:
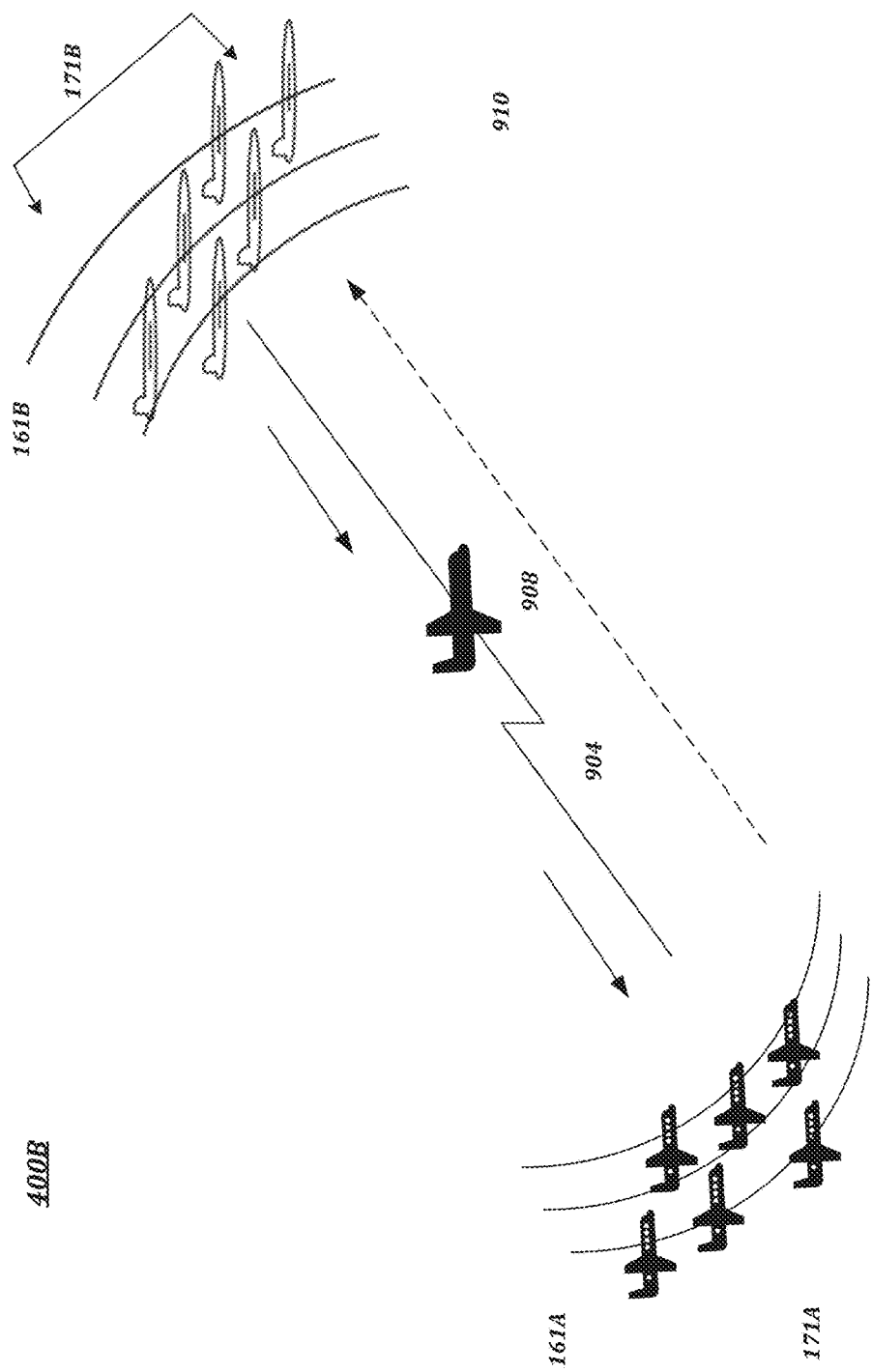
Figure 4C:
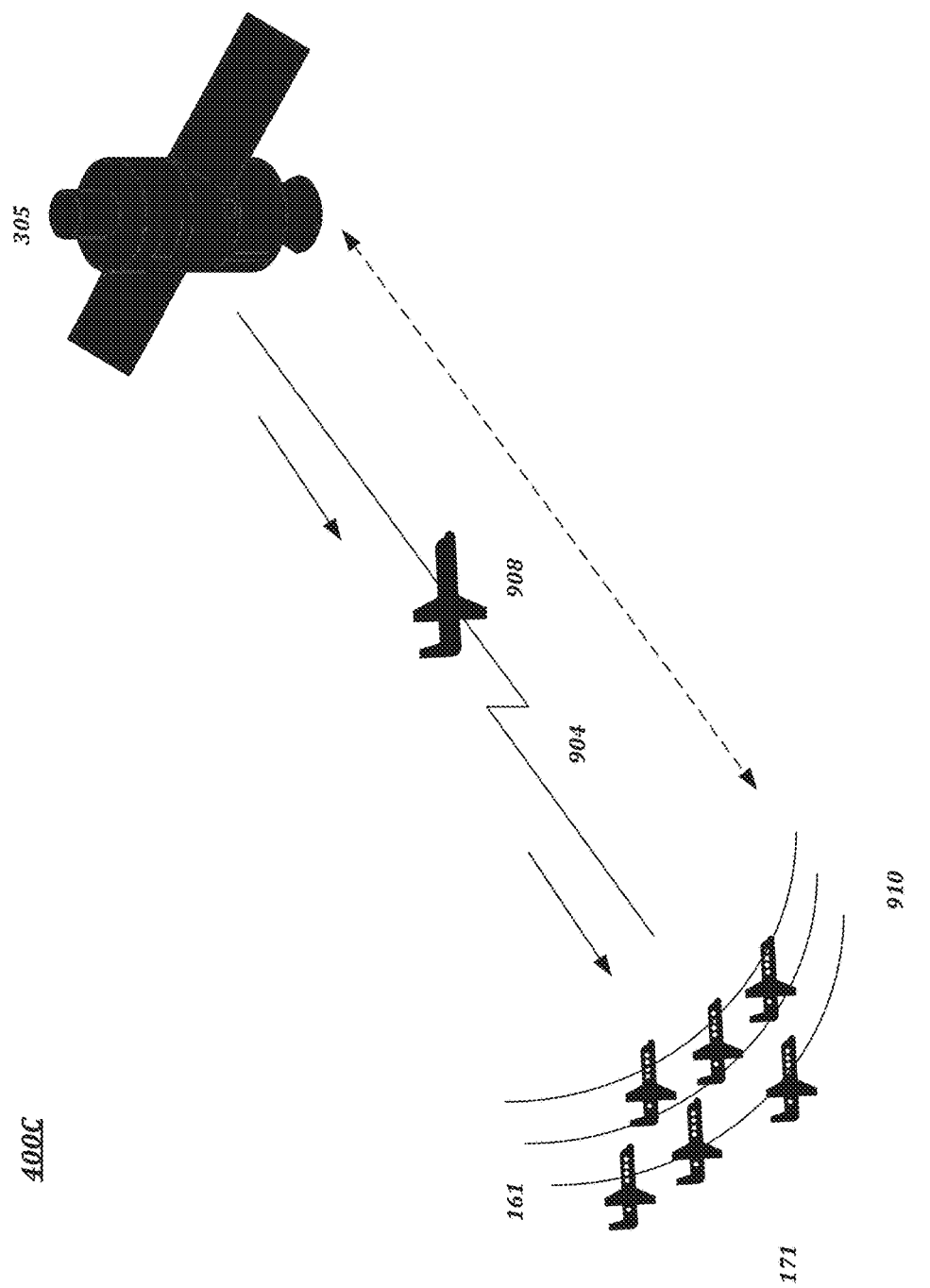

FIG. 4A depicts a reverse transmission of the antenna array as the source to a receiving body. FIG. 4B-4C depicts alternative embodiments of an antenna array using the plurality of platforms.

Figure 5:
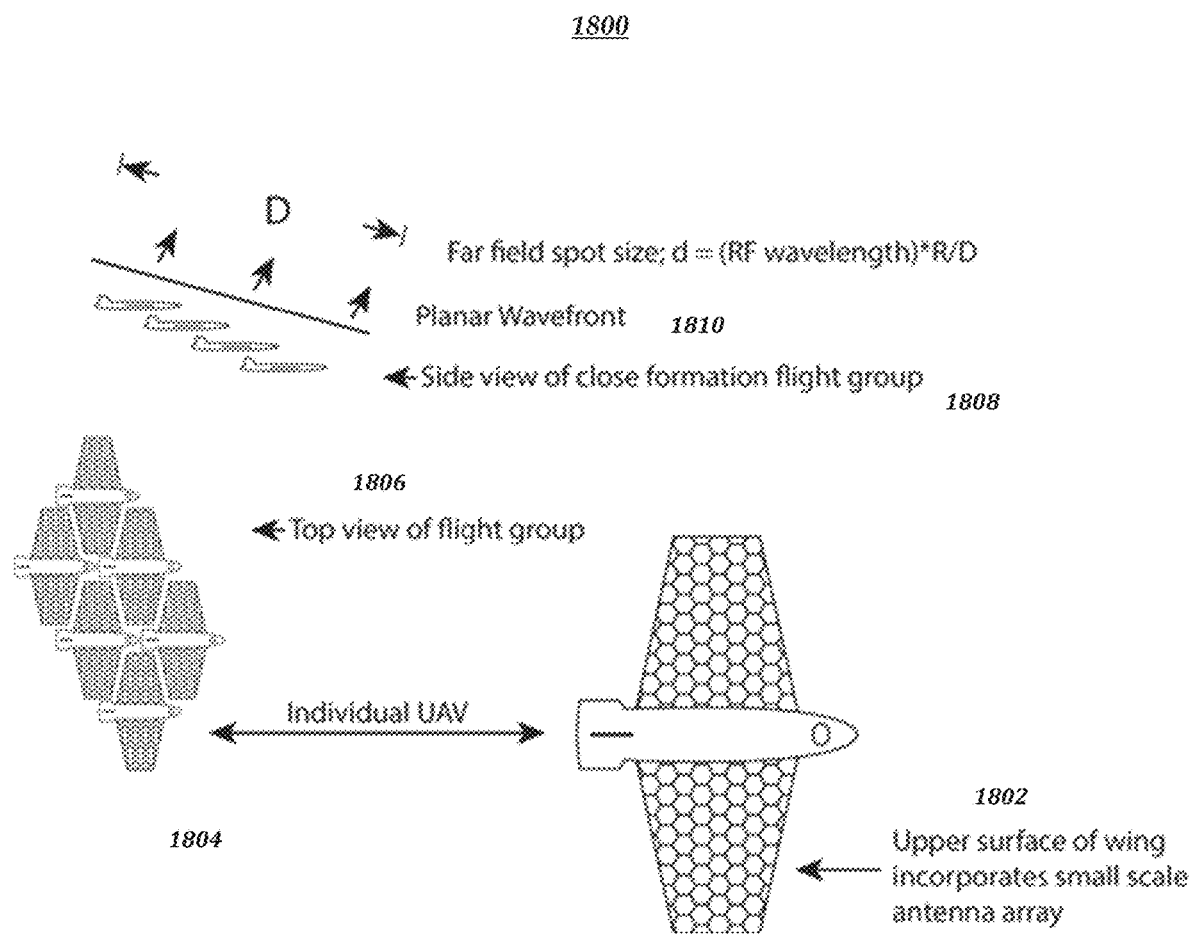

FIG. 5 depicts a UAV shape and close formation flying of aircraft having TALOC units creating a dense antenna array consistent with the present disclosure.

Figure 6A:
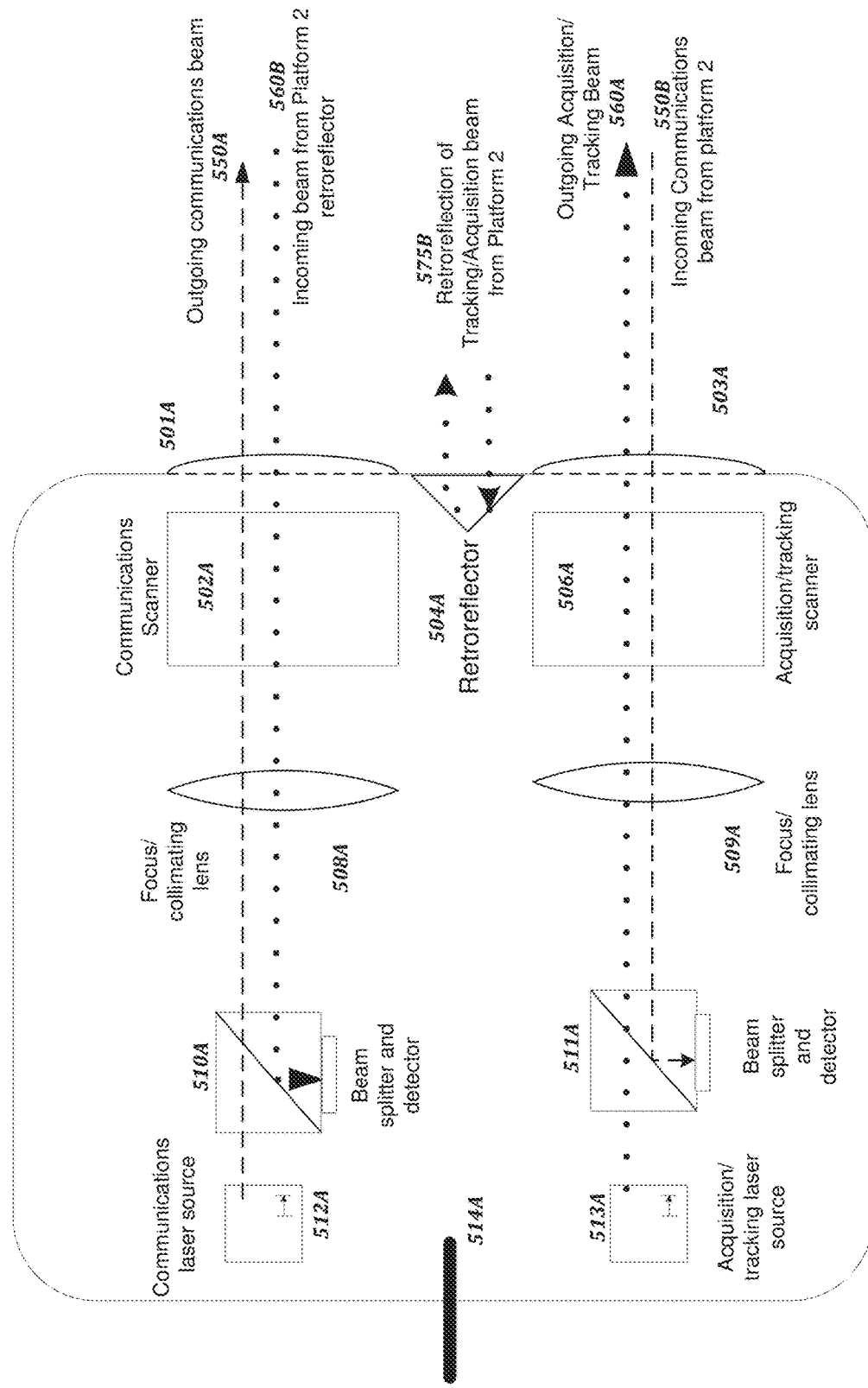
Figure 6B:
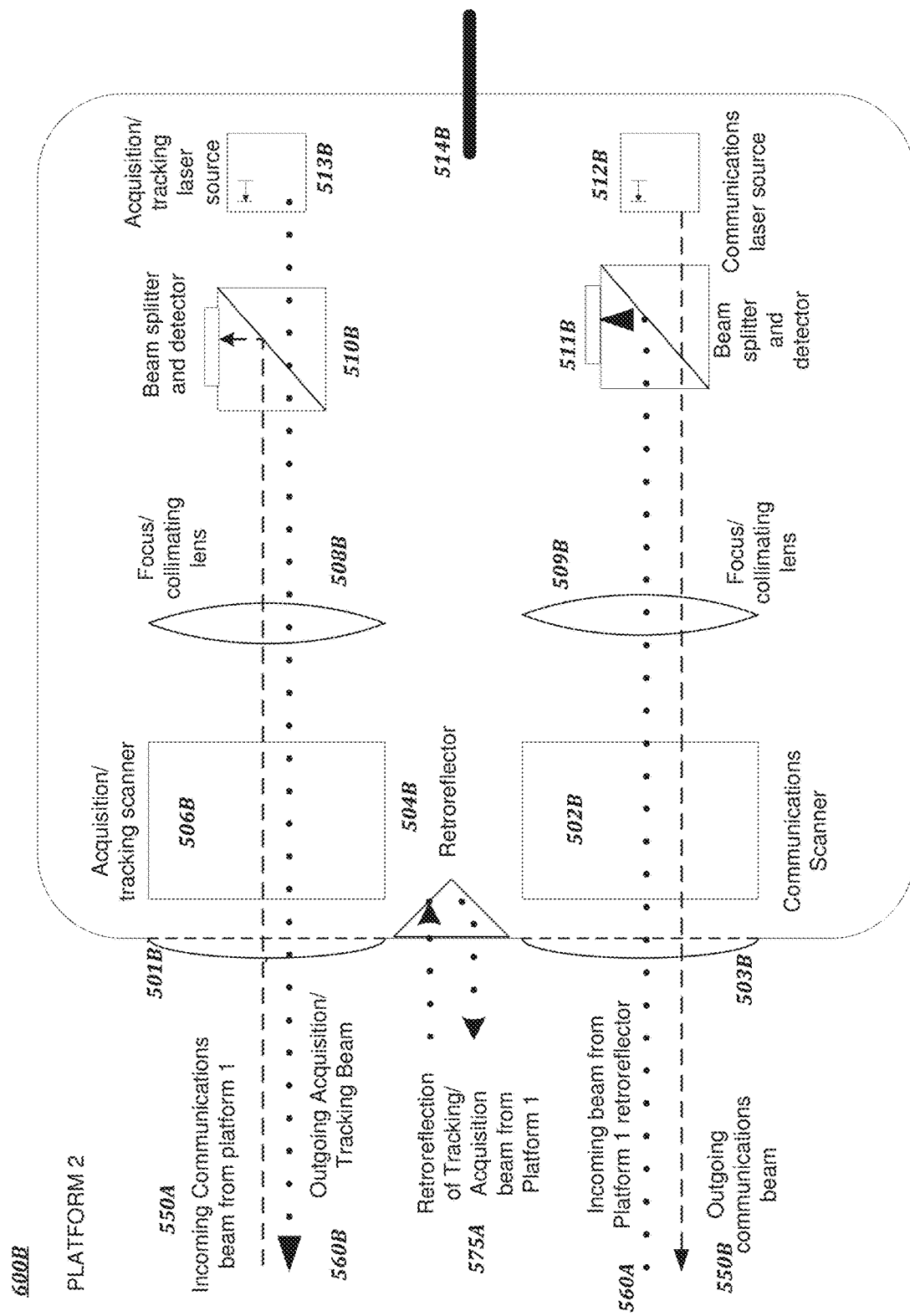

FIG. 6A and FIG. 6B depicts an embodiment of light (optical signal) propagation through a TALOC consistent with the present disclosure.

Figure 7:
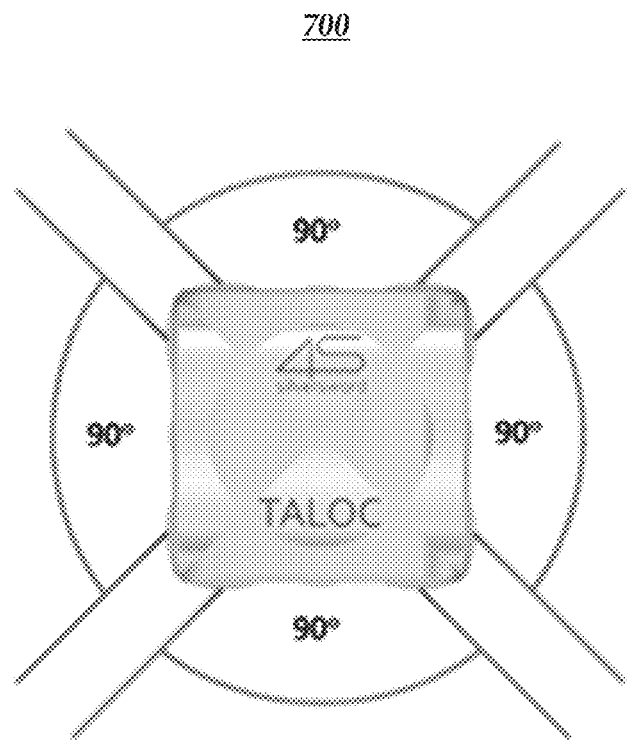

FIG. 7 presents a bottom view of an UAV underside optics showing 4 apertures covering 360 degrees in azimuth of a platform consistent with the present disclosure.

Figure 8:
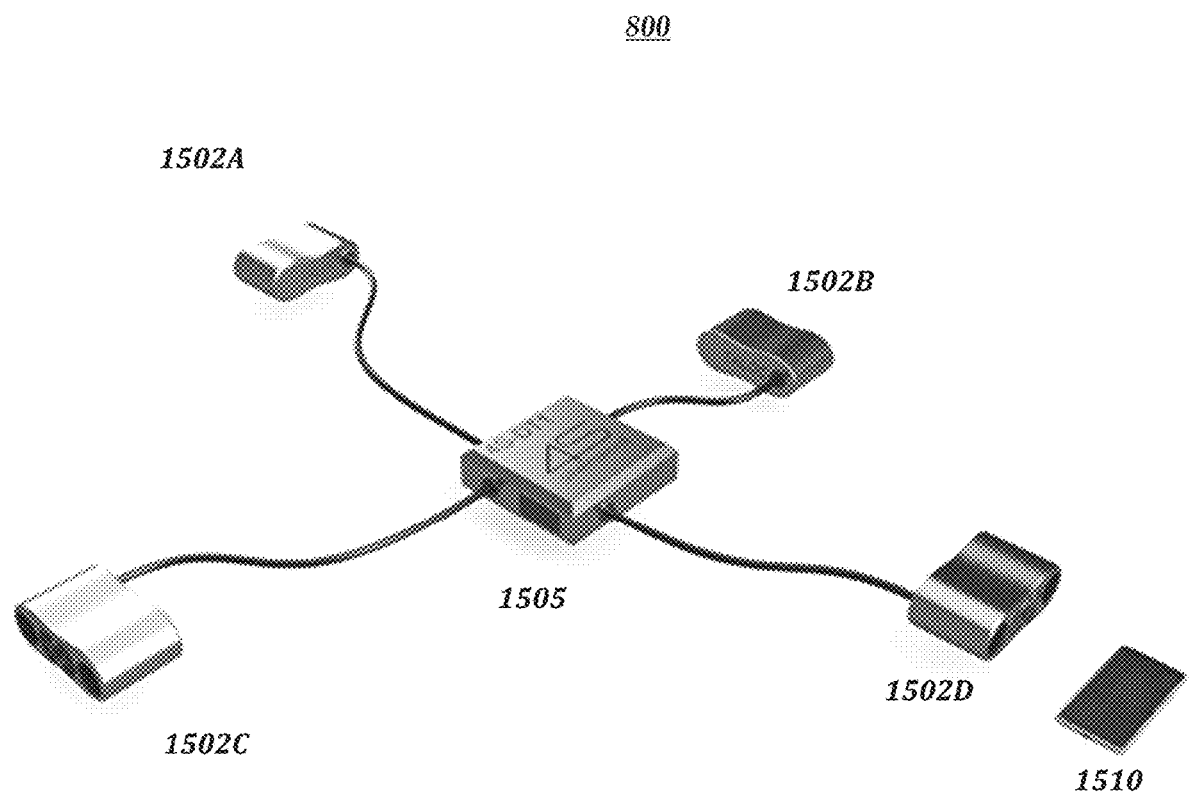

FIG. 8 is a representative embodiment of a TALOC platform consistent with the present disclosure.

Figure 9:
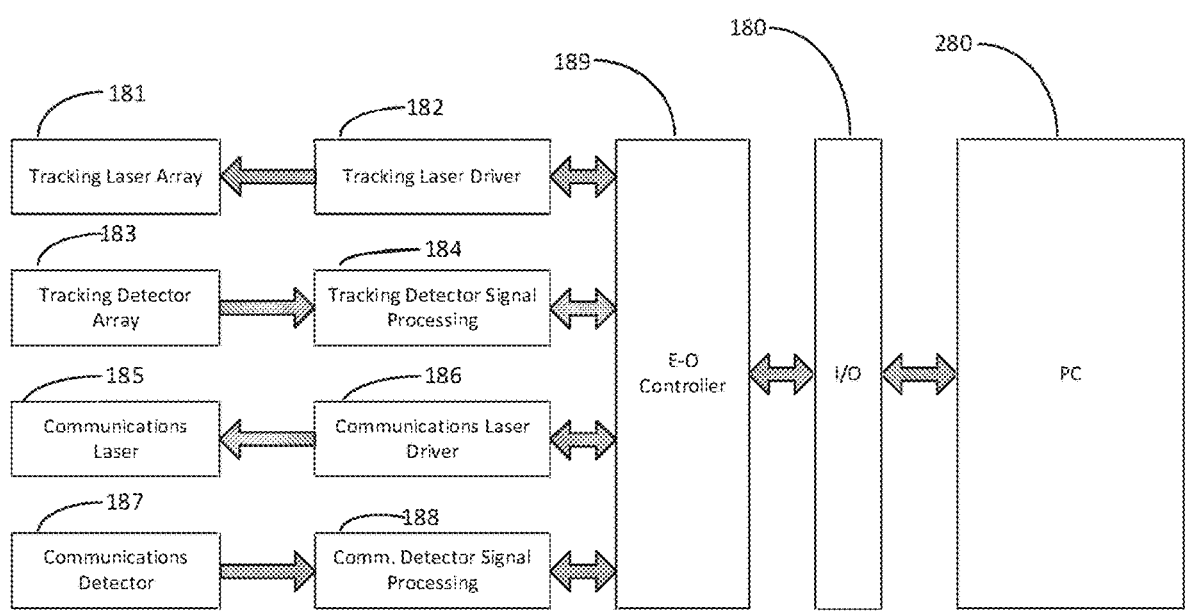

FIG. 9 depicts an electronics block diagram consistent with the present disclosure.

Figure 10:
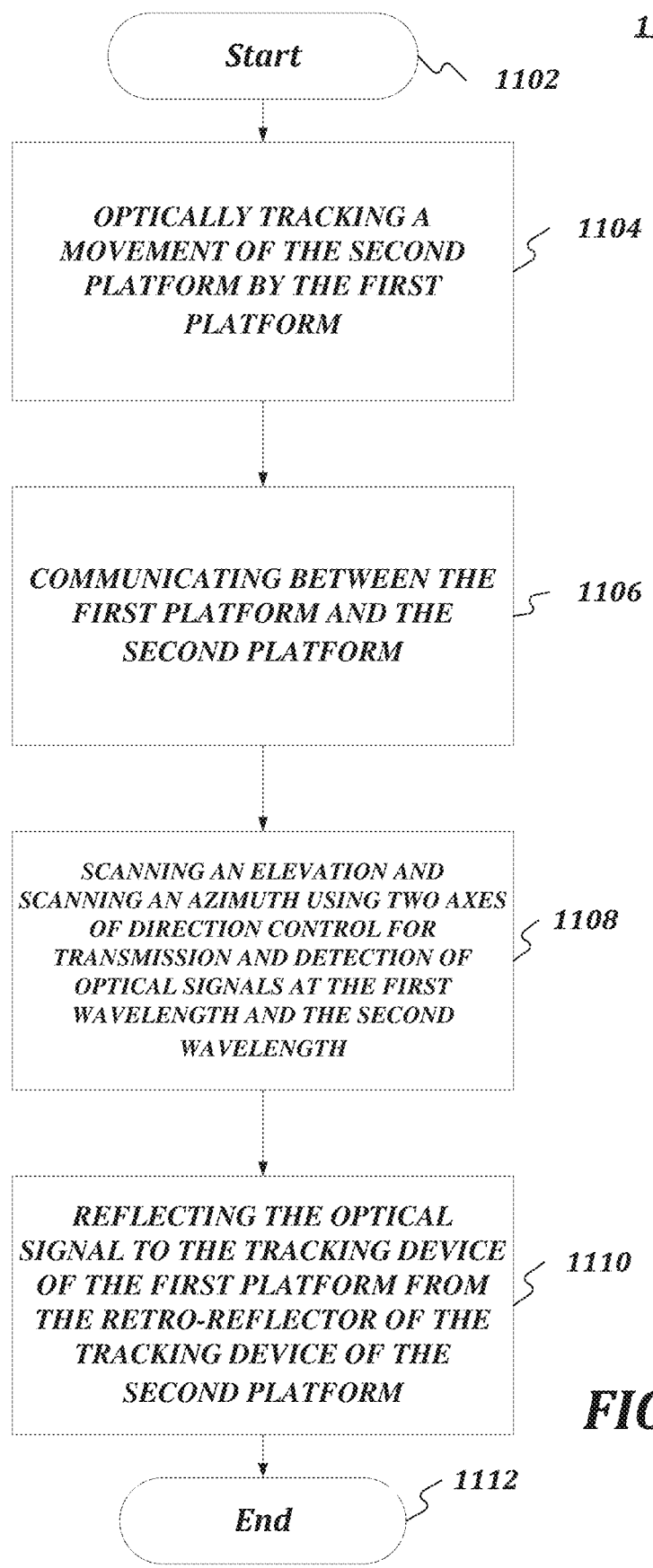

FIG. 10 is a block diagram of a method for determining spatial orientation between two platforms consistent with the present disclosure.

Figure 11:
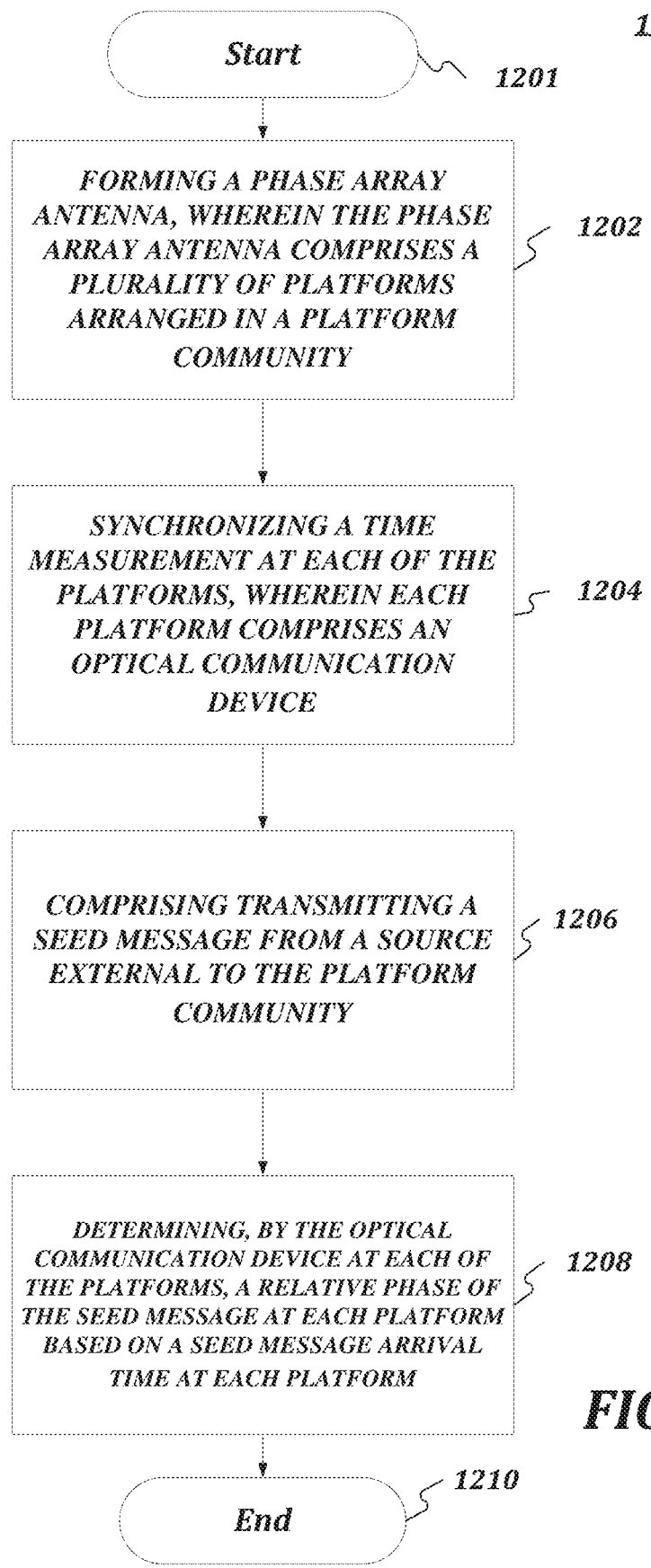

FIG. 11 is a block diagram of a method for determining spatial orientation of platforms as an antenna array consistent with the present disclosure.

Figure 12:
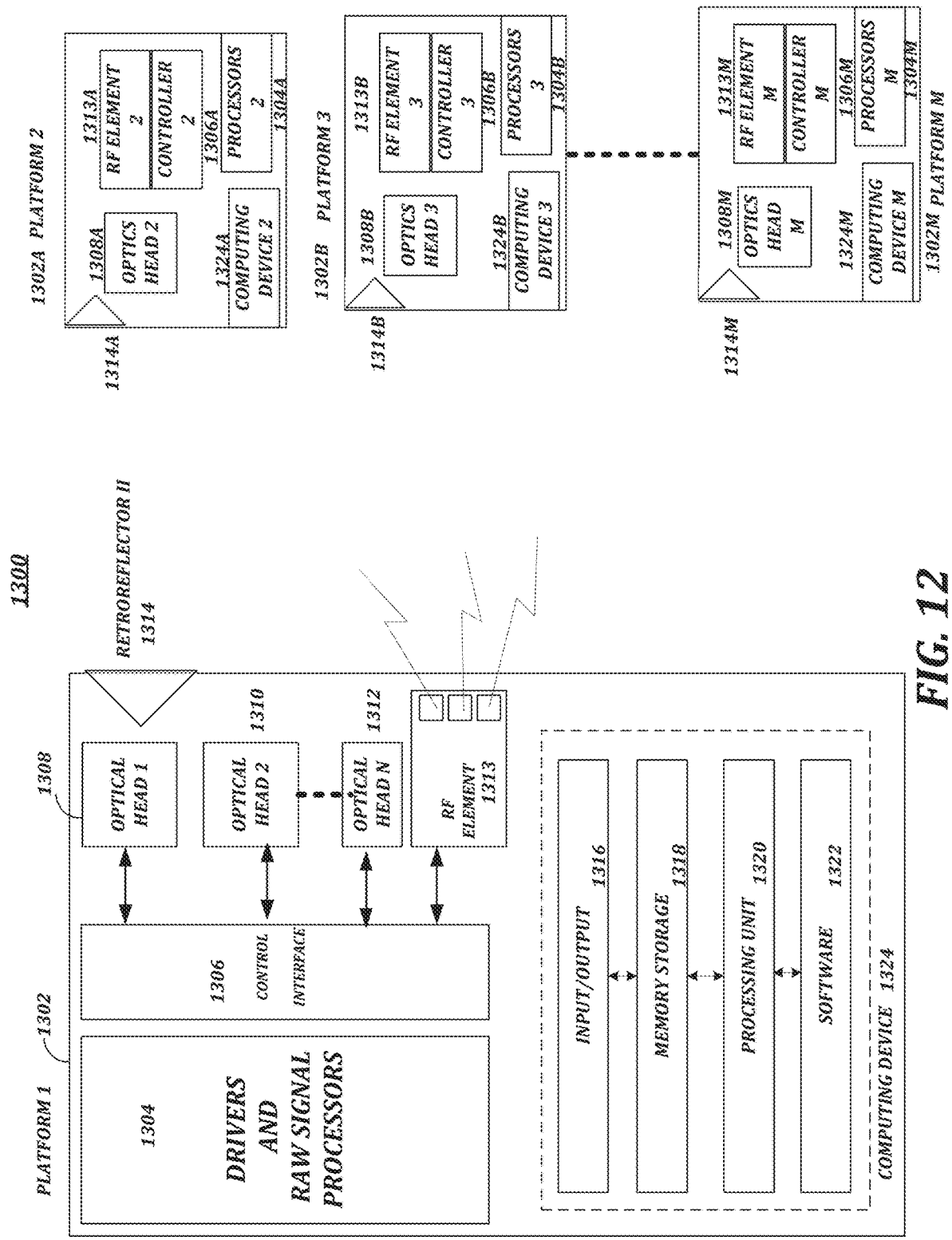

FIG. 12 is a block diagram of a system including a computing device consistent with the present disclosure.

Figure 13:
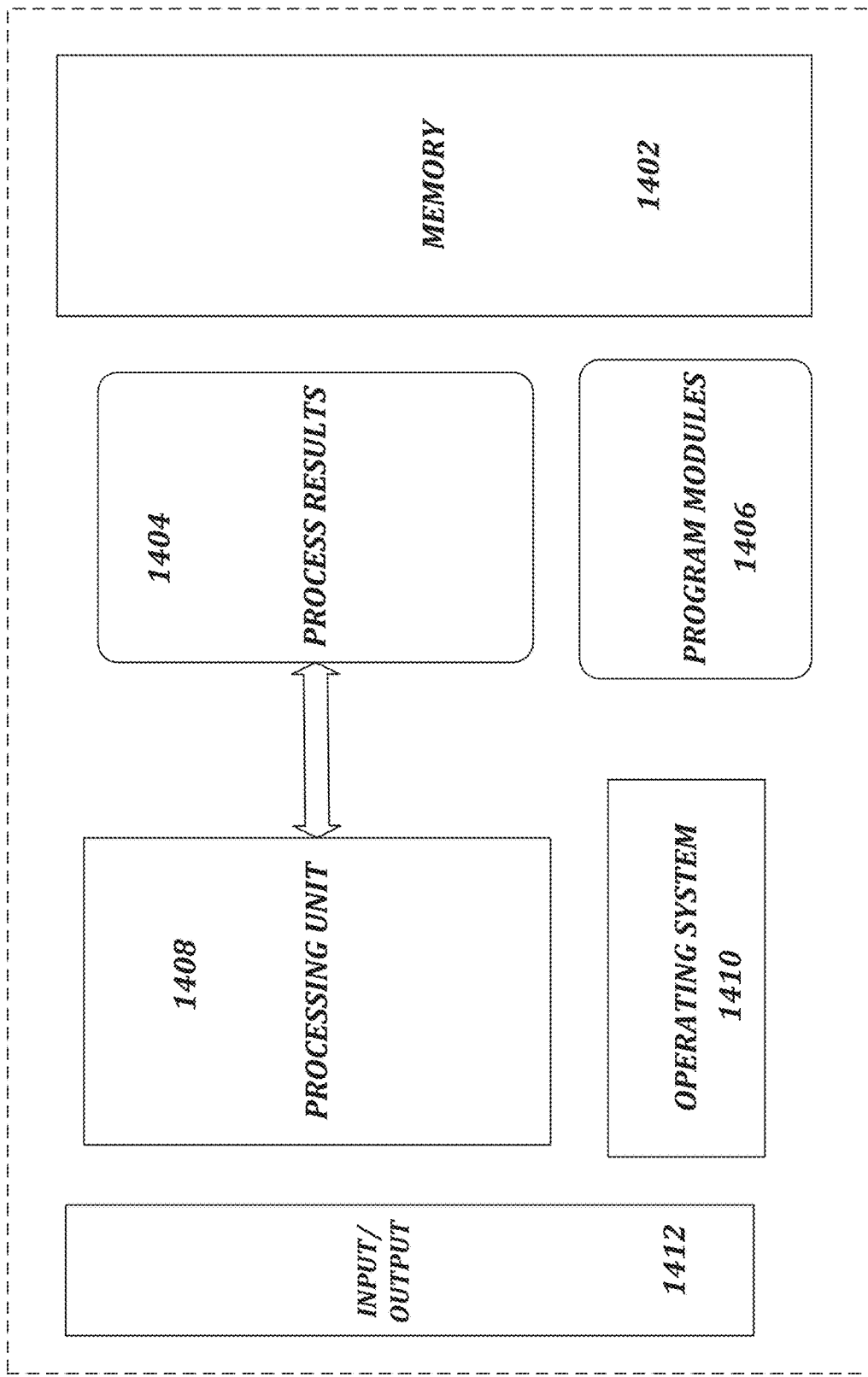

FIG. 13 is a block diagram detailing the computing device of FIG. 13 consistent with the present disclosure.

DETAILED DESCRIPTION OF THE DISCLOSURE

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

For the purposes of this disclosure, time phase is the displacement in time of a waveform, i.e. RF waveform displacement. Space Phase is a displacement in space of an emitter, i.e. emitter location displacement.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of an airborne mesh network forming phase array antenna, embodiments of the present disclosure are not limited to use only in this context.

The term "platform", as used in this description and accompanying claims, shall be defined to mean a physical structure that carries one or more TALOC units and has a defined coordinate system for determining azimuth, elevation and distance to a remote object. Unless explicitly described otherwise, alternative preferred embodiments may have like components and features in common.

An embodiment of the disclosure is illustrated in FIG. 1, in which a platform 111 according to the disclosure takes the form of an unmanned aerial vehicle (UAV). TALOC units are mounted to the front 112, back 113, top 114 and bottom 115 of platform 111. The top and bottom TALOC units can incorporate beam scanning components to address a field of regard in elevation over a range of angles 116 degrees. In an embodiment, angle 116 may be assigned a design value up to 180 degrees. The azimuth angle 117 can range between 90 degrees up to 180 degrees. The top 114 and bottom 115 TALOC units, considered together, may cover a full 360 degrees in elevation around the central platform axis. Front 112 and back 113 mounted TALOC units, in cooperation with top 114 and bottom 115 TALOC units, may provide sufficient angular coverage to enable at least one TALOC to make an optical line-of-sight connection in any direction around the platform.

FIG. 2 shows TALOC measurements between two moving platforms wherein the TALOC platforms are affixed to aircraft vehicles consistent with the present disclosure. Consistent with the embodiment shown in FIG. 1, FIG. 2 shows two unmanned aerial vehicles (UAV), first platform 132 and second platform 134. TALOC units are mounted to the front 112, back 113, top 114 and bottom 115 of platforms 132 and 134. TALCO units mounted on the first platform 132 are indicated as front 112, back 113, top 114 and bottom 115. TALCO units mounted on the second platform 134 are indicated as front 112A, back 113A, top 114A and bottom 115A.

FIG. 2 shows an embodiment of two TALOC units actively measuring, communicating and tracking while attached to two aircraft vehicles. The TALOC units calculate the Azimuth and Elevation Angles and the distance between the TALOC units on the two moving platforms. FIG. 2 depicts azimuth and elevation angle measurement reference coordinates 131 for first platform 132, two angle measurement reference coordinates 133 for second platform 134, and distance 135 measured by a pair of communicating TALOC units. Taking first platform 132 as a reference, second platform 134 orientation is fully determined by the two-angle measurement performed by second platform 134 mounted TALOC. The retro-reflector 125 on second platform 134 mounted TALOC, will produce reflected light directed back to the first platform 132 mounted TALOC. Next, the first platform 132 mounted TALOC detector 122, can detect retro-reflected light from the second platform 134. The retro-reflected light from the second platform 134 can be detected because the retro-reflected light elevation/azimuth direction is equal to a line source emitted beam elevation/azimuth angle from the first platform.

In a further aspect of orientation determination, encoders associated with scanners continuously measure the elevation and azimuth scan angles. The encoder readings can be correlated with the momentary retro-reflection flash. The resulting correlation can indicate the second platform retro-reflector elevation and azimuth angle. Upon detection of retro-reflection and determination of retro-reflector angle pair, the TALOC directs servo tracking of the second platform 134 mounted retro-reflector in two angles. Acquisition and tracking of first platform mounted TALOC by second platform 134 mounted TALOC proceeds in identical fashion to acquisition and tracking of second platform 134 mounted TALOC by first platform 132 mounted TALOC.

Timing of transmitted data bursts is set to avoid fratricidal blanking of detected signal retro-reflected from communicating platform 134 by high power emitted light. A non-blanking time interval is also reserved for detection of optical transmission originating from a communications data laser on the communicating platform 134. The communicating platform 134 carries an identical TALOC unit having a light emitter that derives pointing information from a scanning and tracking line detector operating in the same way as the first platform 132 TALOC acquisition scan and tracking.

Bidirectional optical data transmission can comprise communication between two platforms. In a further aspect, bidirectional communication can include handshake data that confirms the identity of communicating platform. After retro-reflector angle tracking begins in TALOC, short pulses may be transmitted from which range to communicating platform is extracted based on time of flight. Thereafter, range may be continuously tracked. Given range awareness, timing of data bursts can be readily set to avoid crosstalk among emitted light, retro reflected light and laser signals transmitted from the communicating platform 134.

FIG. 3A shows a representative mobile platform community formed into a phase array antenna 171. Consistent with the representative mobile platform community of FIG. 3A, one of the platform community elements, a designated signal seed UAV, is displaced from the main portion of the platform community that is flying in close formation. In a first embodiment, a signal seed displacement is on the order of 1 Km in the general direction of an intended ground station that will ultimately connect to the UAV platform community via phase array RF signal.

An RF signal emitted from the seed UAV toward the platform community main body will form a partial spherical surface. This spherical surface is shown at successive times expanding and passing through the UAV platform community. In one or more embodiments, a TALOC Free Space Optical (FSO) system may provide multi-GHz data exchange among one or more airborne platform community elements in line of sight with one another. The TALOC FSO may further perform the following including but not limited to: measure distance between communicating elements with high accuracy, measure a 2 axis pose angle of a first platform relative to a second communicating platform, and support full function links to multiple communicating elements by designating each of the platform community elements in turn as a first platform that may be connected by multiple beams to other platform community elements and measuring range and angles relative to those other elements. The TALOC enabled mesh network constitutes an expert system with distributed processors capable of fusing all relative distance and angle measurements into a highly accurate 3D map of the overall platform community. For each platform community element in the platform community, the initial range knowledge will be refined by RF signal processing to create knowledge of each UAV antenna element differential range from signal seed UAV to an accuracy of 0.5 mm.

Initial range knowledge will be refined by RF signal processing to create knowledge of each UAV antenna element differential range from signal seed UAV to an accuracy of 0.5 mm. During the course of operations, positional accuracy continues to be refined through data fusion.

Phase array antenna 171 formation begins with synchronized time measurement at each platform in a community. A known seed message is transmitted from a source 172 external to the platform community. Seed message time of arrival at each platform is measured. In a further aspect, the seed message can be transmitted by a centralized server 700, wherein the centralized server 700 can control the phase array antenna 171.

FIG. 3A also depicts a direct application of the schematic phase array antenna that shows phase array geometry 161 internal to an airborne platform community. As shown, a signal 904 is sent to a signal seed UAV 908.18. Signal seed UAV 908 originates the in-phase wave front (signal seed wave front 910). The wave front directed toward the ground station 902 is larger in radius and tilted relative to the signal seed wave front 910. Processors derive phase corrections for beam steering. FIG. 3 also depicts representative locations of platforms in a mobile platform community. When four or more platforms are mutually connected by TALOC units and the platforms 161 are not all coplanar, all six degrees of freedom of all platforms are fully constrained by TALOC measurements and the reference frame of any platform can be used as a universal reference frame for all platforms in the community. In an alternative aspect, FIG. 3B and FIG. 3C, depict alternative embodiments for use of a phase array antenna. As shown in FIG. 3B, the original signal 904 can be generated by a first platform community. In a further aspect of the embodiment in 3B, plurality of platform communities can be used a method of relaying information between each other, a first platform community 161A configured as a first phase array antenna 171A and a second platform community 161B configured as a second phase array antenna 171B. As shown in FIG. 3C, the originating signal can come from a satellite 305 instead of a ground station as shown in FIG. 3A.

As shown in FIG. 4A, the phase array antenna 171 can send a signal back to the ground station Signal seed UAV 908 originates in-phase wave front (signal seed wave front 910). The wave front directed toward the ground station is larger in radius and tilted relative to the signal seed wave front. Processors derive phase corrections for beam steering. Phase array antenna shifts RF waves originating in the platform community from focusing on signal seed UAV to focusing on ground station RF transmitter/receiver units.

In one aspect, 5 RF wavelengths per bit and transmitting 100 bits from signal seed UAV broadcast to all other platform community elements can be used.

In particular, the instantaneous difference between the first word numerical value in the 100 bits sampled in the signal seed transmission and the time referenced repeating bit stream on each UAV gives an absolute time of flight for the transmission to each element.

This embodiment configuration can reduce ambiguity about which of the repeating bit sequences is properly used to measure time of flight between signal seed UAV and a given platform community element. In a further aspect, signal analysis can comprise extracting only the fractional part of the number of wavelengths represented by time of flight measurement. The extraction can yield a value for the phase correction needed to make every platform community element transmission directed toward the signal seed UAV in phase at the signal seed UAV. In yet another embodiment, a different low frequency dither can be applied to each phase correction and Fourier transform processing can be used to measure a received signal sensitivity to each phase correction. The Fourier transform result can lead to rapid optimization of the overall RF platform community to signal seed UAV transmission.

More specifically, arrival time data may be used to compute a relative phase of the seed message at each platform. The seed message is retransmitted by each platform with relative phase reversed. The combined retransmissions form a beam that is in phase back at the original seed message transmitter. By this process, the platform community may become a phase array transmitting antenna 171 with in-phase condition set for communication from platform community to external seed message source. Any signal may be transmitted in this manner provided the measured relative phase values are retained.

Transmitting to locations other than the original seed message source entails calculating changes in relative phase that are required in order to produce in phase wave propagation from platform community elements relative to a spherical surface that is tilted and has a different radius relative to the signal seed centered spherical surface. As the platform community moves away from its original configuration, adjustments to the relative phase values of each platform are made. These adjustments are calculated from periodic re-transmission of seed messages.

In order to use the platform community as a phase array receiving antenna 171, the seed message is relayed from each platform to a central host platform along with synchronized time reference using TALOC units and retransmission from one platform to the next platform. The start times of all received signals are aligned and the signals are added in phase in a central host platform signal processor. In phase addition of platform community array antenna element signals 171 concentrates transmitted power and thereby mitigates the effect of jamming and providing a degree of covert protection to RF transmissions to and from the platform community.

With respect to the aforementioned embodiments, FIGS. 4A, 4B, and 4C depict the one or more platform communities and the platform community elements operating with the relative phase reversed and the signal propagating in an alternative or opposite direction.

FIG. 5 shows a custom UAV shape and close formation flying of aircraft having TALOC units creating a dense antenna array consistent with the present disclosure. FIG. 5, 1802 shows an upper surface of a UAV wing which incorporates a small-scale antenna array. The individual UAV may fly in a flight group crating a larger scale antenna array as shown in FIG. 5, 1804. FIG. 5, 1806 shows a top view of a flight group. FIG. 5, 1808 shows a side view of a close formation flight group. FIG. 5, 1810 show a planar wave front. FIG. 5 shows a far field spot size (d) equal to the product of an RF wavelength and R/D. where D is the lateral dimension containing the close formation flight group.

FIG. 6A and FIG. 6B depict the optical signal paths that are generated, transmitted and reflected from a first platform 600A and a second platform 600B. The information provided by each of these optical communications signal interactions can provide spatial orientation data from other platforms in the platform community. Further as shown in FIG. 6A, a lens 501A receives an incoming bean 560B from Platform 2 600B retroreflector 504B. The beam 560B travels through a communications scanner 502A, a focus/collimating lens 508A, before terminating at a beam splitter and detector 510A. Communications laser source 512A sends an outgoing communications beam 550A out of lens 501A. Platform 1 600A comprises a retroreflector 504A wherein retroreflector 504A receives a tracking/acquisition beam 576B from platform 2 600B which is retroreflected by retroreflector 504A. Platform 1 600A receives an incoming communications beam from platform 2 550B at lens 503A. Communications beam 550B travels through acquisition/tracking scanner 506A, focus/collimating lens 509A, before it terminates at beam splitter and detector 511A. Acquisition/tracking laser source transmits an outgoing acquisition/tracking beam 560A from 513A which exits via lens 503A. Platform 1, 600A is attached to a cable 514A which attaches to a central TALOC unit 1505.

Further as shown in FIG. 6B, a lens 503B receives an incoming bean 560B from Platform 2 600B retroreflector 504B. The beam 560B travels through a communications scanner 502B, a focus/collimating lens 509B, before terminating at a beam splitter and detector 511B. Communications laser source 512B sends and outgoing communications beam 550B out of lens 503B. Platform 2 600B comprises a retroreflector 504B wherein retroreflector 504B receives a tracking/acquisition beam 576A from platform 1 600A which is retroreflected by retroreflector 504B. Platform 2 600B receives an incoming communications beam from platform 1 550A at lens 501B. Communications beam 550A travels through acquisition/tracking scanner 506B, focus/collimating lens 508B, before it terminates at beam splitter and detector 510B. Acquisition/tracking laser source 513B transmits an outgoing acquisition/tracking beam 560B from 513B which exits via lens 501B. Platform 2, 600B is attached to a cable 514B which attaches to a central TALOC unit. With regard to the communication between the platforms, the scanners direct on-axis light originating in lases to selected azimuth and elevation angles in the field of regard. Scanners also direct incoming light from selected azimuth and elevation angles on axis to detectors. The tracking detector signal processor compares detector signal to a predetermined threshold and sends an indication of retroreflector signal received to the central processor. The communications detector signal processor conditions detected signal in preparation for information exchange in the central processor.

FIG. 7 presents a bottom view of an UAV underside optics showing 4 apertures covering 360 degrees in azimuth of a platform consistent with the present disclosure. The orientation of FIG. 7 as a bottom view obscures the retroreflector arrays from view.

FIG. 8 is a representative embodiment of a TALOC platform consistent with the present disclosure. FIG. 8 shows the TALOC platform units 1502A, 1502B, 1502C, 1502D, central TALOC unit 1505 and remote TALOC unit 1510. The TALOC platform units operate together to form a 360-degree short and medium range TALOC unity system.

FIG. 9 depicts an electronics block diagram consistent with the present disclosure. In a further aspect an onboard microprocessor 280 can be used to control the individual operations of each platform, a block diagram for is shown in FIG. 9. Elements shown include: tracking laser array 181, tracking laser driver 182, tracking detector array 183, tracking detector signal processing 184, communications laser 185, communications laser driver 186, communications detector array 187, communications detector array signal processing 188, electo-optics controller 189, input/output interface 180, and onboard microprocessor 280, As shown, onboard microprocessor 280 controls the operation of all elector-optics elements via mediation of input/output interface 180 and electo-optic controller 189.

The onboard microprocessor 280 for each platform can be controlled by a separate module. Although method 1000 has been described to be performed by a centralized server. it should be understood that, in some embodiments, different operations may be performed by different networked elements in operative communication with a with each other such as a distributed processing system. The distributed processing system can also comprise a peer to peer mesh network between the UAVs.

In a further aspect, any suitable combination of hardware, software, or firmware may be used to implement the processor 280. The aforementioned system, device, and processors are examples and other systems, devices, and processors may comprise the aforementioned memory storage and processing unit, consistent with embodiments of the disclosure. In yet a further aspect the processor 280 or can comprise a local memory or system memory. The local memory may comprise, but is not limited to, volatile (e.g. random-access memory (RAM)), non-volatile (e.g. read-only memory (ROM)), flash memory, or any combination. System memory may include one or more operating systems, one or more programming modules, and may include a program data. One or more operating systems, for example, may be suitable for controlling computing device 1324's or 1400's operation. In one embodiment, programming modules may include drivers and raw signal processors. Furthermore, embodiments of the disclosure may be practiced in conjunction with a graphics library, other operating systems, or any other application program and is not limited to any particular application or system. This basic configuration is illustrated in FIG. 12 and FIG. 13 by those components within a dashed line 1324 and 1400.

Consistent with embodiments of the present disclosure, an airborne mesh network forming phase array antenna may be provided. This overview is provided to introduce a selection of concepts in a simplified form that are further described below. This overview is not intended to identify key features or essential features of the claimed subject matter. Nor is this overview intended to be used to limit the claimed subject matter's scope. Embodiments of the disclosure may be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a communication system coupled to electronic circuits for the purpose of forming a phase array antenna.

In other aspects, microprocessor 280 or central server may interface to with other computing devices 1324 and 1400, such as over a network in a distributed computing environment, for example, a Flying Ad Hoc Networks (FANET) or Better Approach To Mobile Adhoc Networking (B.A.T-.M.A.N.). Communication connections as depicted by the bidirectional arrows in FIG. 13 and FIG. 14 is one example of communication media. Communication media may typically be embodied by data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wireless media such as radio frequency (RF), infrared, and other wireless media. The term computer readable media as used herein may include both storage media and communication media. In conjunction with the microprocessor 280 or central server.

The TALOC 132, 134 operates simultaneously in two modes; acquisition and communication. Link budget must be calculated separately for each mode because acquisition entails round trip optical propagation and the required detection bandwidth is different for the two modes.

FIG. 10 depicts a flowchart of a method for determining the spatial orientation of two platforms in free space. The method initiates with the step 1102 by initializing a first platform and a second platform. In one aspect initializing a platform can include providing power to an optical element in the TALOC so a communication and optical signal are established. In another aspect, initializing a platform can also include generating an optical signal for tracking or communication with a second platform. The method 1100 can proceed to tracking a movement of the second platform by the first platform. As discussed in FIG. 2 and FIGS. 6A and 6B, step 1104 can include optically tracking a movement of the second platform by the first platform. In a further aspect of Step 1104, optically tracking the movement of the second platform can include using a tracking device disposed on each of the first platform and the second platform. Step 1106 can include communicating between the first platform and the second platform. In a further aspect, the communication between the first and second platform can be on a second wavelength. In addition, the communication between the first platform and the second platform can be performed using an optical tracking device.

The method 1100 can further comprise step 1108, scanning an elevation and scanning an azimuth using two axes of direction control for transmission and detection of optical signals at the first wavelength and the second wavelength. In a further aspect, the first wavelength and the second wavelength can range between 0.1 to 20 micrometers. In addition, the optical signals can include sufficient strength and intensity to propagate through a free space medium in the presence of atmospheric obscurations comprising one or more of water, particulate matter, and at least partially transparent solids. The method 1100 can further include additional steps for determining the movement between two platforms. In particular, method 1100 can include transmitting an optical signal from the first platform to a retro-reflector of the tracking device of the second platform.

The method can also include step 1110, reflecting the optical signal to the tracking device of the first platform from the retro-reflector of the tracking device of the second platform. The method 1100 can comprise detecting the reflected optical signal by the retro-reflector of the tracking device of the first platform. The method can also include determining, by the tracking device of the first platform, a retro-reflector angle pair associated with the second platform. The method 1100 can further include tracking, by the tracking device of the first platform, a position of the second platform using the retro-reflector angle pair.

FIG. 11 is a block diagram of a method for deterring spatial orientation of platforms as an antenna array consistent with the present disclosure. FIG. 111 depicts the method 1200, the method may comprise forming a phase array antenna from a plurality of platforms. The method initiates at step 1202 which includes forming a phase array antenna, wherein the phase array antenna comprises a plurality of platforms arranged in a platform community. The method can proceed to step 1204 comprising synchronizing a time measurement at each of the platforms, wherein each platform comprises an optical communication device. The method 100 can proceed to step 1206 comprising transmitting a seed message from a source external to the platform community. Step 1208 can include determining, by the optical communication device at each of the platforms, a relative phase of the seed message at each platform based on a seed message arrival time at each platform. Method 1200 can proceed to a step which comprises retransmitting the seed message by each of the platforms with the relative phase reversed, as discussed in FIGS. 4A, 4B, and 4C. Method 1200 can proceed to a step which includes generating an optical signal that is in-phase with the seed message received from the source external to the platform community. In a further aspect, generating the optical signal in-phase with the seed message, can comprise combining multiple retransmissions of the seed message with the relative phase reversed. In a further aspect, the platform community can include at least 3 platforms. The subsequent step of method 1200 can include relaying the seed message from each platform to a central host platform along with a synchronized time reference using the optical communication device. In a further aspect of said step, synchronizing the time measurement can include measuring the seed message time of arrival at each platform.

The determination of the antenna array can also include orienting at least one of the platforms at a first altitude in outer space outside of earth's atmosphere and disposing at least one other of the plurality of platforms at a second altitude within earth's atmosphere. The method 1200 can further comprise reflecting an optical signal to the optical communication device of a first platform from a retro-reflector of the optical communication device of a second platform; detecting the reflected optical signals by a detector array of a tracking device of the first platform; determining, by the tracking device of the first platform, a retro-reflector angle pair associated with the second platform; and tracking, by the tracking device of the first platform, a position of the second platform using the reflector angle pair. The method of claim 12 can also comprise relaying the seed message from each platform to a central host platform along with a synchronized time reference using the optical communication device from at least one of the platforms of the platform community.

FIG. 12 is a block diagram of a system including a computing device consistent with the present disclosure. The block diagram of the system 1300 depicted in FIG. 13 includes a first platform, platform 1 1302 comprising one or more elements/modules including but not limited to: drivers and raw signal processors module 1304; a control interface 1306 coupled in communication to an optical head 1 1308, an optical head 2 1310, . . . an optical head N 1312; an RF element 1313, the RF element 1313 configured to communicate via at least one RF communication medium; a retroreflector II 1314 and a computing device 1324, the computing device comprising at least the following modules: input/output 1316; memory storage 1318; processing unit 1320; and software module 1322.

The block diagram of the system 1300 depicted in FIG. 12 includes a second platform, platform 2 1302A comprising one or more elements/modules including but not limited to: drivers and raw signal processors module 1304A; a control interface 1306A coupled in communication to an optics head 2 1308A; an RF element 1313A, the RF element 1313A configured to communicate via at least one RF communication medium; a retroreflector II 1314A and a computing device 1324A the computing device comprising at least the following modules: input/output 1316; memory storage 1318; processing unit 1320; and software module 1322.

The block diagram of the system 1300 depicted in FIG. 12 includes a third platform, platform 3 1302B comprising one or more elements/modules including but not limited to: drivers and raw signal processors module 1304B; a control interface 1306B coupled in communication to an optics head 3 1308B; an RF element 1313B, the RF element 1313B configured to communicate via at least one RF communication medium; a retroreflector II 1314B and a computing device 1324B the computing device comprising at least the following modules: input/output 1316; memory storage 1318; processing unit 1320; and software module 1322.

The block diagram of the system 1300 depicted in FIG. 12 includes another platform, platform M 1302M comprising one or more elements/modules including but not limited to: drivers and raw signal processors module 1304M; a control interface 1306M coupled in communication to an optics head M 1308M; an RF element 1313M, the RF element 1313M configured to communicate via at least one RF communication medium; a retroreflector II 1314M and a computing device 1324M the computing device comprising at least the following modules: input/output 1316; memory storage 1318; processing unit 1320; and software module 1322.

FIG. 13 is a block diagram detailing the computing device of FIG. 13 consistent with the present disclosure. The block diagram of the computing device 1400 depicted in FIG. 14 includes the computing device 1400 comprising at least the following modules: input/output 1412; memory 1402; processing unit 1408; operating system 1410; program modules 1406; the processing unit producing process results 1404

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved. Many additional features and benefits of the disclosure will be obvious to those versed in the art.

What is claimed is:

1. An airborne mesh network forming RF phase array antenna comprising:
   a plurality of mobile platforms, wherein each mobile platform comprises:
   at least one RF emitter, wherein the at least one RF emitter is in phase with at least one other mobile platform for wave propagation in a selected direction;
   an optical communications device utilizing a retroreflector for determining platform positional information,
   wherein the optical communication device further comprises
      a processor configured to provide at least a tracking mode and a communications mode;
      an input-output interface coupled to the processor;
      an electro-optic controller coupled to the input-output interface;
      an acquisition-tracking portion coupled to the electro-optic controller;
      a communication portion coupled to the electro-optic controller; and
   wherein at least one mobile platform of the plurality of mobile platforms is a designated signal seed;
   wherein the airborne mesh network forming RF phase array antenna is a Free Space Optical system to provide relative distance and angle measurements into a map of an overall platform community.

2. The airborne mesh network forming RF phase array antenna of claim 1 wherein the at least one RF emitter comprises an inphase condition that is enabled by a high bandwidth optical mesh network.

3. The airborne mesh network forming RF phase array antenna of claim 1, further comprising an external source, wherein the external source is at least one of: a satellite, a ground station, a second RF phase array antenna, and a communication signal.

4. The optical communication device of claim 1, wherein the acquisition-tracking portion further comprises: a tracking laser coupled to the electro-optic controller via a tracking laser driver; and a tracking detector array coupled to the electro-optic controller via a tracking detector signal processor.

5. The optical communication device of claim 4, wherein the communication portion further comprises: a communications laser coupled to the electro-optic controller via a communications laser driver; and a communications detector coupled to the electro-optic controller via communications detector signal processor.

6. The optical communication device of claim 1 further comprising a tracking laser and a communications laser wherein the tracking laser and the communications laser are a common laser.

7. The optical communication device of claim 1 further comprising: a tracking laser and a communications laser wherein the tracking laser is a first laser and the communications laser is a second laser.

8. The airborne mesh network forming RF phase array antenna of claim 1 further comprising wherein the designated signal seed is displaced from the plurality of mobile platforms flying in close formation.

9. The airborne mesh network forming RF phase array antenna of claim 1 wherein at least one mobile platform of the plurality of mobile platforms is an unpiloted airborne vehicle.

10. The airborne mesh network forming RF phase array antenna of claim 1 wherein each mobile platform is an unpiloted airborne vehicle.

11. The airborne mesh network forming RF phase array antenna of claim 1, further comprising wherein the airborne mesh network forming RF phase array antenna is a Free Space Optical system performing at least one of:
   measuring distance between communicating elements,
   measuring a 2 axis pose angle of a first platform relative to a second communicating platform, supporting links to multiple communicating elements by designating each of the platform community elements in turn as a first platform that is connected by multiple beams to other platform community elements, and measuring range and angles relative to those other elements.

* * * * *